(12) United States Patent
Qiao et al.

(10) Patent No.: US 10,996,069 B2
(45) Date of Patent: May 4, 2021

(54) ADAPTIVE, IMITATIVE NAVIGATIONAL ASSISTANCE

(71) Applicant: International Business Machines Corporation, Armonk, NY (US)

(72) Inventors: Mu Qiao, Belmont, CA (US); Dylan J. Fitzpatrick, Pittsburgh, PA (US); Divyesh Jadav, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 189 days.

(21) Appl. No.: 16/124,143

(22) Filed: Sep. 6, 2018

(65) Prior Publication Data
US 2020/0080861 A1 Mar. 12, 2020

(51) Int. Cl.
| | |
|---|---|
| *G01C 21/34* | (2006.01) |
| *G01C 21/36* | (2006.01) |
| *G06N 3/04* | (2006.01) |
| *G06N 3/08* | (2006.01) |
| *G01C 21/20* | (2006.01) |

(52) U.S. Cl.
CPC ....... *G01C 21/3629* (2013.01); *G01C 21/206* (2013.01); *G06N 3/0472* (2013.01); *G06N 3/08* (2013.01)

(58) Field of Classification Search
CPC .............. G01C 21/3629; G01C 21/206; G06N 3/0472; G06N 3/08; G06N 3/0454
USPC ....................................................... 701/431
See application file for complete search history.

(56) References Cited

U.S. PATENT DOCUMENTS

| | | | |
|---|---|---|---|
| 8,538,688 | B2 | 9/2013 | Prehofer |
| 9,389,085 | B2 | 7/2016 | Khorashadi et al. |
| 9,726,501 | B2 | 8/2017 | Benel |
| 2012/0143495 | A1 | 6/2012 | Dantu |

(Continued)

OTHER PUBLICATIONS

Judah et al., "Active Imitation Learning via Reduction to I.I.D. Active Learning," preprint for UAI, 2012, 10 pages, retrieved from https://arxiv.org/ftp/arxiv/papers/1210/1210.4876.pdf.

(Continued)

*Primary Examiner* — Nadeem Odeh
(74) *Attorney, Agent, or Firm* — Zilka-Kotab, P.C.

(57) ABSTRACT

Systems, methods, and computer program products for adaptive, imitation learning and applications to navigational assistance are disclosed. The inventive concepts include receiving a plurality of trajectories, each trajectory describing a path through a dynamic, complex physical environment; receiving a request for navigational assistance through the dynamic, complex physical environment; and in response to receiving the request for navigational assistance: generating a navigational assistance trajectory through the dynamic, complex physical environment, the navigational assistance trajectory being based at least in part on at least one of the plurality of trajectories; generating auditory instructions in accordance with the navigational assistance trajectory; and transmitting the navigational assistance trajectory and the auditory instructions to a mobile device from which the request for navigational assistance was received. A user receiving the navigational assistance trajectory and auditory instructions may navigate through the complex, dynamic physical environment without relying on visual cues.

20 Claims, 4 Drawing Sheets

(56) References Cited

U.S. PATENT DOCUMENTS

| | | | | |
|---|---|---|---|---|
| 2015/0160018 | A1* | 6/2015 | Ameling | G01C 21/206 |
| | | | | 701/467 |
| 2015/0362319 | A1* | 12/2015 | Friedlander | G01C 21/00 |
| | | | | 701/400 |
| 2016/0223340 | A1* | 8/2016 | Shin | G01C 21/206 |
| 2016/0341554 | A1 | 11/2016 | Hillier et al. | |
| 2017/0038214 | A1* | 2/2017 | Benel | G01S 19/05 |

OTHER PUBLICATIONS

Ho et al., "Generative Adversarial Imitation Learning," 30th Conference on Neural Information Processing Systems (NIPS), 2016, pp. 1-9.

Praveen et al., "Blind Navigation Assistance for Visually Impaired Based on Local Depth Hypothesis from a Single Image," Procedia Engineering, vol. 64, 2013, pp. 351-360.

Aladren et al., "Navigation Assistance for the Visually Impaired Using RGB-D Sensor With Range Expansion," IEEE Systems Journal, vol. 10, No. 3, Sep. 2016, pp. 922-932.

Kanwal et al., "A Navigation System for the Visually Impaired: A Fusion of Vision and Depth Sensor," Applied Bionics and Biomechanics, 2015, 17 pages.

Yang et al., "Detecting Traversable Area and Water Hazards for the Visually Impaired with a pRGB-D Sensor," Sensors, 2017, pp. 1-20.

Ross et al., "Efficient Reductions for Imitation Learning," 13th International Conference on Artificial Intelligence and Statistics (AISTATS), 2010, pp. 1-8.

Ng et al., "Algorithms for Inverse Reinforcement Learning," 17th International Conference on Machine Learning, 2000, 8 pages, retrieved from http://citeseerx.ist.psu.edu/viewdoc/summary?doi=10.1.1.41.7513.

* cited by examiner

Algorithm 1 Generative adversarial imitation learning

1: Input: Expert trajectories $\tau_E \sim \pi_E$, initial policy and discriminator parameters $\theta_0$, $w_0$
2: for $i = 0, 1, 2, \ldots$ do
3: Sample trajectories $\tau_i \sim \pi_{\theta_i}$
4: Update the discriminator parameters from $w_i$ to $w_{i+1}$ with the gradient $$\hat{\mathbb{E}}_{\tau_i}[\nabla_w \log(D_w(s,a))] + \hat{\mathbb{E}}_{\tau_E}[\nabla_w \log(1 - D_w(s,a))] \qquad (17)$$

5: Take a policy step from $\theta_i$ to $\theta_{i+1}$, using the TRPO rule with cost function $\log(D_{w_{i+1}}(s,a))$. Specifically, take a KL-constrained natural gradient step with $$\hat{\mathbb{E}}_{\tau_i}[\nabla_\theta \log \pi_\theta(a|s) Q(s,a)] - \lambda \nabla_\theta H(\pi_\theta), \qquad (18)$$
$$\text{where } Q(\bar{s}, \bar{a}) = \hat{\mathbb{E}}_{\tau_i}[\log D_{w_{i+1}}(s,a) | s_0 = \bar{s}, a_0 = \bar{a}]$$

6: end for

FIG. 3
(prior art)

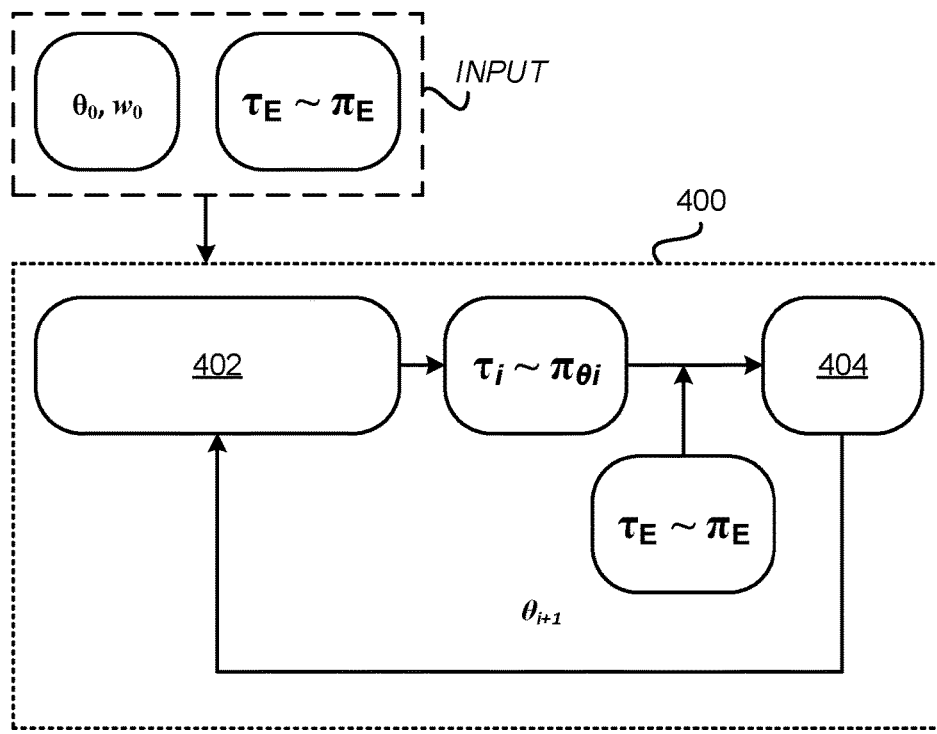

FIG. 4

ADAPTIVE, IMITATIVE NAVIGATIONAL ASSISTANCE

BACKGROUND

The present invention relates to facilitating navigation through complex, dynamic indoor/outdoor environments and more particularly, this invention relates to facilitating navigation without relying on visual/optical input, e.g. for the visually impaired.

Navigation can be a very challenging task for the visually impaired, especially in complex environments where the individual might encounter dynamic obstacles such as new/rearranged furniture, other pedestrians, construction equipment, road/sidewalk blockages, standing water, etc.

Current approaches to navigation assistance for the visually impaired rely on very sophisticated or expensive devices and/or sensors, such as cameras and corresponding image processing capabilities (e.g. computer vision), position sensors (e.g. global positioning sensors), network sensors/equipment (e.g. Bluetooth sensors, Wi-Fi sensors, etc.), and audio sensors and equipment (e.g. speakers and microphones). These conventional approaches also typically rely on remote servers and knowledge bases, e.g. an information server to facilitate route planning, directional guidance, and speech recognition, and the Internet generally, e.g. for passenger information, maps, and service databases.

These systems are very expensive to maintain and utilize, both in terms of financial cost and computational cost. The image processing techniques required to render and interpret optical input from the camera are particularly expensive in terms of computational cost, and are not reliable for detecting objects without clearly defined edges, or about which the image processing algorithm does not have sufficient a priori knowledge (e.g. regarding the expected shape, dimensions, color, etc.). Moreover, and in part due to the relative expense of collecting and processing the image data, these conventional techniques generally do not provide sufficient updates/resolution to adapt the navigational assistance to dynamic changes occurring in the environment, e.g. rearrangement of furniture or appearance of obstacles caused by weather, traffic, or any other dynamic process.

Accordingly, it would be of great benefit to provide novel techniques for navigational assistance that do not rely on the expensive, unreliable optical techniques employed to-date. Moreover, it would be beneficial to provide navigational assistance capable of adjusting to dynamic changes in the environment over time.

SUMMARY

According to one embodiment, a computer-implemented method for adaptive imitation learning and navigational assistance includes: receiving a plurality of trajectories, each trajectory describing a path through a dynamic, complex physical environment; receiving a request for navigational assistance through the dynamic, complex physical environment; and in response to receiving the request for navigational assistance: generating a navigational assistance trajectory through the dynamic, complex physical environment, the navigational assistance trajectory being based at least in part on at least one of the plurality of trajectories; generating auditory instructions in accordance with the navigational assistance trajectory; and transmitting the navigational assistance trajectory and the auditory instructions to a mobile device from which the request for navigational assistance was received.

According to another embodiment, a computer program product for adaptive, imitative navigational assistance includes a computer readable storage medium having program instructions embodied therewith. The computer readable storage medium is not a transitory signal per se, and the program instructions are executable by a processor, to cause the processor to perform a method. The method includes: receiving, at the processor, a plurality of trajectories, each trajectory describing a path through a dynamic, complex physical environment; receiving, at the processor, a request for navigational assistance through the dynamic, complex physical environment; and in response to receiving the request for navigational assistance: generating, using the processor, a navigational assistance trajectory through the dynamic, complex physical environment, the navigational assistance trajectory being based at least in part on at least one of the plurality of trajectories; generating, using the processor, auditory instructions in accordance with the navigational assistance trajectory; and transmitting the navigational assistance trajectory and the auditory instructions to a mobile device from which the request for navigational assistance was received.

According to still yet another embodiment, a system for adaptive, imitative navigational assistance includes: a processor; and logic integrated with the processor, executable by the processor, or integrated with and executable by the processor. The logic is configured to: receive a plurality of trajectories, each trajectory describing a path through a dynamic, complex physical environment; receive a request for navigational assistance through the dynamic, complex physical environment; and in response to receiving the request for navigational assistance: generate a navigational assistance trajectory through the dynamic, complex physical environment, the navigational assistance trajectory being based at least in part on at least one of the plurality of trajectories; generate auditory instructions in accordance with the navigational assistance trajectory; and transmit the navigational assistance trajectory and the auditory instructions to a mobile device from which the request for navigational assistance was received.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3 is an algorithm for Generative Adversarial Imitation Learning (GAIL), according to one embodiment.

FIG. 4 is a flowgram of an algorithm applying GAIL to navigational policy generation, according to one embodiment.

DETAILED DESCRIPTION

Figure 1:
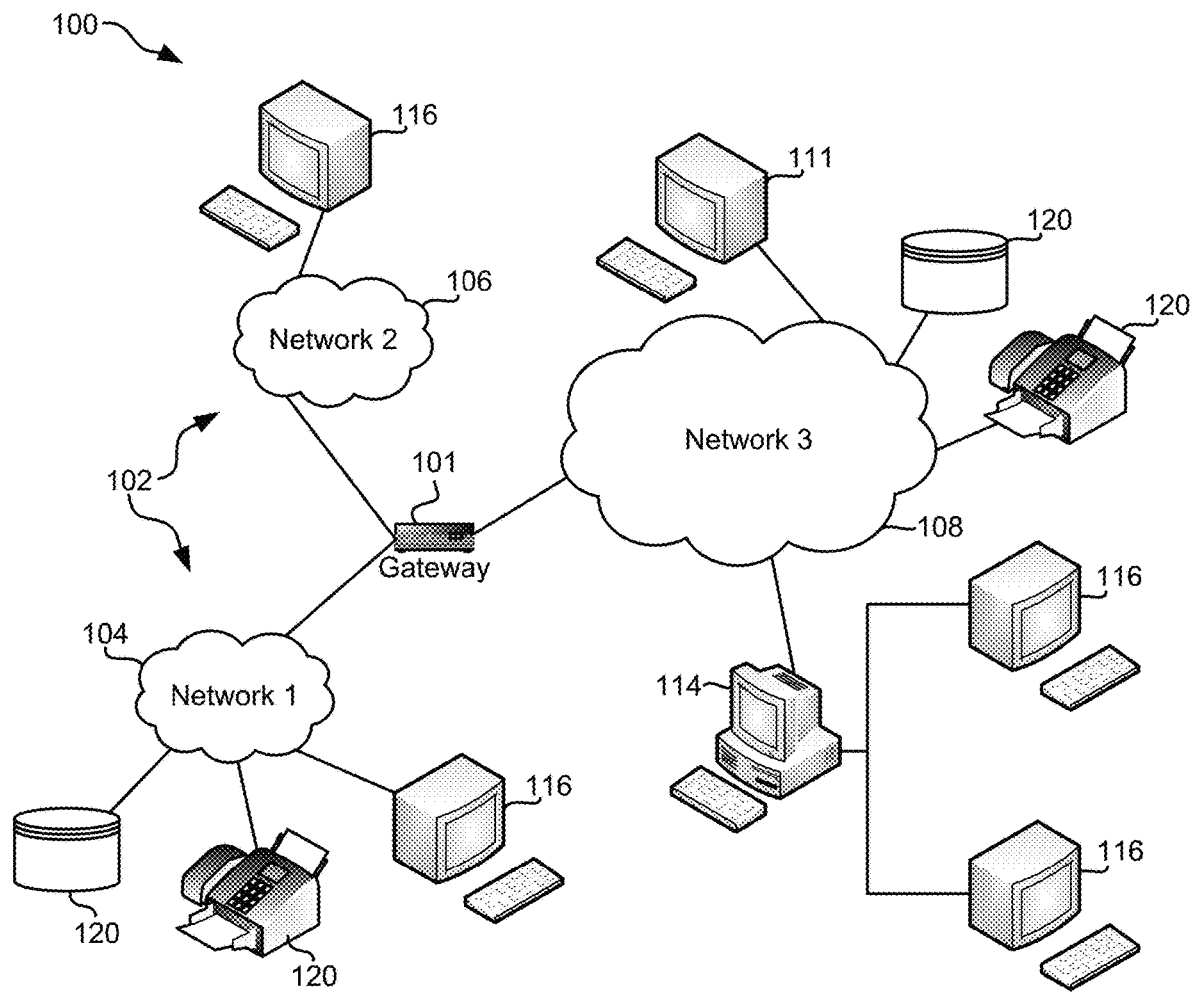
FIG. 1 is a simplified schematic of a network architecture 100, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of facilitating navigating indoor/outdoor environments and more particularly, this invention relates to facilitating navigation without relying on visual/optical input, e.g. for the visually impaired, as well as related systems and methods.

Notably, the presently described inventive concepts are "adaptive" in the sense that the navigational assistance and trajectories upon which such assistance is based are capable of adapting to changes in a complex, dynamic environment. In various embodiments, such changes include, without limitation, any form of spatial rearrangement of an environment. For example, weather, traffic, construction activity, etc. may create a constantly changing (dynamic) set of conditions and spatially arranged obstacles within an outdoor environment. Similarly, traffic, rearrangement of furniture, remodeling/renovating, etc. that involves changing the layout of an indoor environment are examples of dynamic changes that can occur within a given space, and which the present invention is capable of adapting to in real-time or near-real time based on expert trajectories.

According to one general embodiment, a computer-implemented method for adaptive imitation learning and navigational assistance includes: receiving a plurality of trajectories, each trajectory describing a path through a dynamic, complex physical environment; receiving a request for navigational assistance through the dynamic, complex physical environment; and in response to receiving the request for navigational assistance: generating a navigational assistance trajectory through the dynamic, complex physical environment, the navigational assistance trajectory being based at least in part on at least one of the plurality of trajectories; generating auditory instructions in accordance with the navigational assistance trajectory; and transmitting the navigational assistance trajectory and the auditory instructions to a mobile device from which the request for navigational assistance was received.

According to another general embodiment, a computer program product for adaptive, imitative navigational assistance includes a computer readable storage medium having program instructions embodied therewith. The computer readable storage medium is not a transitory signal per se, and the program instructions are executable by a processor, to cause the processor to perform a method. The method includes: receiving, at the processor, a plurality of trajectories, each trajectory describing a path through a dynamic, complex physical environment; receiving, at the processor, a request for navigational assistance through the dynamic, complex physical environment; and in response to receiving the request for navigational assistance: generating, using the processor, a navigational assistance trajectory through the dynamic, complex physical environment, the navigational assistance trajectory being based at least in part on at least one of the plurality of trajectories; generating, using the processor, auditory instructions in accordance with the navigational assistance trajectory; and transmitting the navigational assistance trajectory and the auditory instructions to a mobile device from which the request for navigational assistance was received.

According to still yet another general embodiment, a system for adaptive, imitative navigational assistance includes: a processor; and logic integrated with the processor, executable by the processor, or integrated with and executable by the processor. The logic is configured to: receive a plurality of trajectories, each trajectory describing a path through a dynamic, complex physical environment; receive a request for navigational assistance through the dynamic, complex physical environment; and in response to receiving the request for navigational assistance: generate a navigational assistance trajectory through the dynamic, complex physical environment, the navigational assistance trajectory being based at least in part on at least one of the plurality of trajectories; generate auditory instructions in accordance with the navigational assistance trajectory; and transmit the navigational assistance trajectory and the auditory instructions to a mobile device from which the request for navigational assistance was received.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
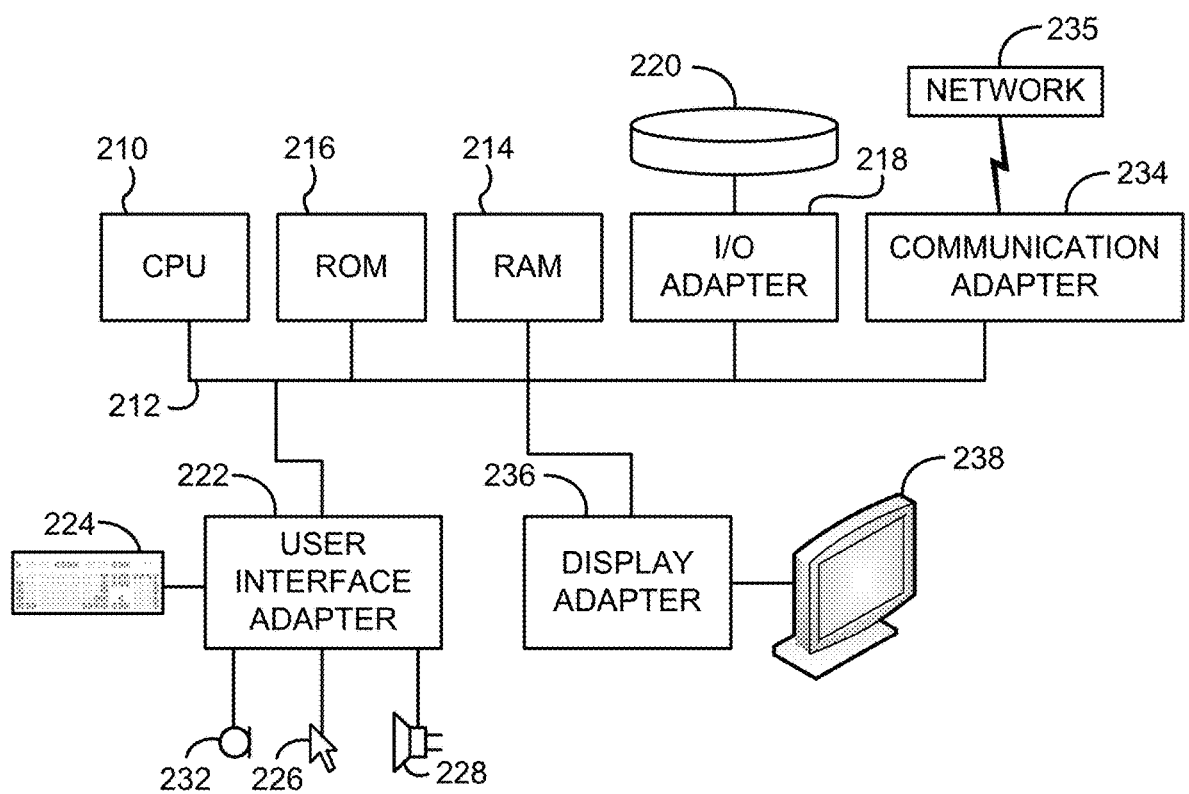
FIG. 2 is a simplified schematic of a representative hardware environment associated with a user device 116 and/or server 114 of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

In preferred embodiments, training data are in the form of trajectories because navigation is essentially a sequential decision process. Trajectories may be collected through a monitoring or positioning system, and are provided as expert training data to a deep imitation learning algorithm. This deep imitation learning algorithm is configured to generate similar trajectories through the space, and its ability to do so is improved by collecting the trajectories in real-time over a given period (e.g. a day, a week, a month, a year, or any time increment as appropriate under the circumstances).

With or without training, but preferably with, the deep imitation learning algorithm generates a suitable trajectory to the desired endpoint based on similar trajectories that others have taken, and provides navigation assistance through auditory feedback. The system is robust and adaptive to obstacles in the environment and changes in the environment. Moreover, by using trajectories obstacles may be avoided without the need for conventional image analysis, because the trajectories taken by the experts will naturally avoid such obstacles, especially in the aggregate. These obstacles may be difficult or impossible to detect visually, e.g. due to poorly-defined edges, lack of a priori knowledge regarding the obstacle, or the like. Moreover, the obstacles are dynamic and may change position within the environment, so the location thereof is difficult or impossible to predict over time and thus to encode directly into a navigation algorithm. Further still, using the trajectories obviates the need to rely on computationally expensive image processing techniques to attempt object detection.

The inventive approach generally involves three principal steps to generate a policy for assisting individuals to navigate through an environment. First, the process generally includes continuously collecting trajectories from users (preferably experts) navigating through an environment, e.g. using a monitoring and/or registration system including sensors/capabilities such as video surveillance, Bluetooth location, radio frequency identification, Wi-Fi location, BLE beacons, or other sensor suitable technology given the operating environment (e.g. GPS does not work well indoors, and Wi-Fi location may not have sufficient coverage to work outdoors).

In some embodiments, trajectories may be weighted, e.g. according to distance between start and end point, travel time, time of day, day of week, user ID (e.g. a given user may be more or less "trusted" than others and trajectories submitted by that user may be more or less heavily weighted accordingly), etc. as would be understood by a person having ordinary skill in the art upon reading the present descriptions. For instance, if a given individual's behavior or duties require frequent traversal of a given environment, the trajectories generated by this person may be more reliable and thus more heavily weighted than a user visiting a location for a first time or who is typically confined to only certain portions of the environment. For example, a tour guide's trajectories may be given greater weight than those of a visitor (especially a first-time visitor), or an executive employee whose known or expected navigation behavior only takes the individual through select paths, e.g. from the entry to an office (and back), from an office to a restroom (and back), etc. as would be understood by a person having ordinary skill in the art upon reading the present disclosure. In other embodiments, trajectories may be assigned equal weight, or be unweighted.

Second, the general process involves extracting expert trajectories representing all paths taken between various points throughout the environment. In preferred approaches, the expert trajectories may be extracted at regular intervals to detect changes in user navigation throughout the environment, and update the predicted trajectories to reflect such changes, preferably in real-time or near real-time. For instance, trajectories may be extracted on an hourly basis, a daily basis, a weekly basis, a monthly basis, an annual basis, etc. Preferably, the extraction interval depends on one or more factors, the factors including, but not being limited to: the nature of the environment (e.g. indoor, outdoor, frequency of change, population, the needs or schedule of a particular visually impaired individual (e.g. frequency of visiting a particular location), resources available to gather and process navigation data, time of day (e.g. trajectories need not be collected at night when no users are present at a location), day of week (e.g. trajectories need not be collected on non-working days), and any combination thereof, as well as equivalents that would be understood by a person having ordinary skill in the art upon reading the present descriptions.

Third, the general process includes providing the expert trajectories to a deep imitation learning algorithm, such as shown in FIGS. 3-4 and described in further detail below. The output of the deep imitation learning algorithm is a policy that can be used to provide instructions to an individual actively seeking assistance navigating through the corresponding environment. The instructions are preferably provided in the form of a sequence of decisions/actions for the individual to make/take in order to advance from an initial position to a final destination.

The algorithm is an imitation algorithm in that it observes actions (here, trajectories) taken by a user, or other control entity, who is assumed to be an expert, and generates an accurate representation of the observed actions. Examples of imitation learning include self-driving vehicles learning to navigate based on observing human engagement with the vehicle (e.g. steering input, accelerator input, braking, signaling, etc.), robotic arms learning to grasp an object based on observing humans doing the same, smart appliances learning settings over time and automatically adjusting settings according to historical patterns, etc. as would be understood by a person having ordinary skill in the art upon reading the present disclosure.

The algorithm generally includes/utilizes an observation space $o_t$ and an action space $a_t$. The algorithm seeks to define a policy $\pi$, which is a stochastic model of individual navigation throughout the environment. In one embodiment, the policy $\pi$ is based on high-dimensional (e.g. being characterized by an n-dimensional space, where n is a value of at least 100), non-discrete (e.g. continuous) decision spaces, and may be represented by a series of decisions (equivalently, a decision sequence) each representing a position in the observation space and a corresponding action in the action space. The aggregate of these observations/actions defines a trajectory navigating through the physical space. In preferred approaches the algorithm may utilize a known generative adversarial imitation learning (GAIL) approach substantially in accordance with Algorithm 1 as shown in FIG. 3, and described in further detail by Ho, et al., "Generative Adversarial Imitation Learning" 30th Conference on Neural Information Processing Systems (NIPS 2016), Barcelona, Spain, which is herein incorporated by reference in its entirety.

GAIL operates by finding a saddle point (π, D) of the expression $$\mathbb{E}_\pi[\log(D(s,a))] + \mathbb{E}_{\pi_E}[\log(1-D(s,a))] = \lambda H(\pi) \quad (1)$$

with both π and D represented using function approximators. GAIL fits a parameterized policy $\pi_\theta$, with weights θ, and a discriminator network Dw: S×A→(0, 1), with weights w. GAIL alternates between a gradient step on w to increase Eq. (1) with respect to D, and a Trust Region Policy Optimization (TRPO) step on θ to decrease Eq. (1) with respect to π. The TRPO step prevents the policy from changing too much due to noise in the policy gradient.

FIG. 4 is a flowgram representing an application of Algorithm 1 as shown in FIG. 3 to the problem of navigational policy generation. According to the embodiment shown in FIG. 4 the procedure 400 employs a navigation policy generator 402 and a navigation policy discriminator 404. The generator 402 generates stochastic policies based on expert training data (i.e., expert trajectories $\tau_E \sim \pi_E$), while the discriminator 404 attempts to distinguish between the policies generated by the generator and policies describing the expert training data.

This general procedure 400 proceeds iteratively in the following fashion. Input is in the form of expert trajectories $\tau_E \sim \pi_E$, an initial policy weight $\theta_0$, and an initial discriminator weight $w_0$. For first iteration i=0, Generator 402 generates stochastic sample trajectories $\tau_0 \sim \pi_{\theta 0}$ based on the initial policy weight $\theta_0$. The sample trajectories $\tau_0 \sim \pi_{\theta 0}$ and expert trajectories $\tau_E \sim \pi_E$ are provided to the discriminator 404, where discriminator parameter $w_i$ is updated to $w_{i+1}$ as described in FIG. 3, Algorithm 1 step 4. Using a cost function as shown in FIG. 3, Algorithm 1 step 5, the discriminator outputs an updated policy weight $\theta_{i+1}$, which represents a step in the initial policy $\theta_0$. Subsequent iterations i≥1 follow the same basic progression. The corresponding weights from the previous iteration are used. The procedure 400 is repeated iteratively until the sample and expert trajectories reach convergence, at which point the discriminator 404 can no longer distinguish between the expert and predicted (generated) policies using Algorithm 1.

While the preferred embodiment of the inventive concepts described herein employs a GAIL algorithm for imitative learning, it should be understood that other imitative learning techniques may be employed without departing from the scope of the invention.

Regardless of the particular imitative learning approach employed, the convergent policy $\pi_\theta(a_t|o_t)$ is output, and ready for use by an individual seeking assistance to navigate throughout the environment. For example, an individual navigating through or entering an environment equipped with appropriate location sensors as described herein may launch an application, preferably a mobile application, for navigation assistance. Using sensors in the environment and corresponding sensors included/installed in the device running the application, the individual's current location of may be determined. The individual's current location $o_i$ (usually an initial location such as an entry to the environment in question) and desired final location $o_f$ may be provided to the mobile application, and policy $\pi_\theta(a_t|o_t)$ applied to generate a stochastically-determined action $a_t$, which is returned to the user, e.g. in the form of auditory feedback, haptic feedback, or any combination thereof. The action is stochastic in that there is a probability associated with each possible action state (e.g. each direction) possible for the given observational state (e.g. location/position).

In various embodiments, auditory feedback may be in any suitable form of providing direction for the user to move in, such as to turn (rotate) or move (translate) in a particular direction for a particular distance. The feedback may or may not be explicit, e.g. the feedback may instruct the individual to turn right ninety degrees, or move forward three meters, steps, etc. In more embodiments, the feedback may be implicit, e.g. by repeating the instruction "turn right" or "move forward" until the user has reached the desired angle or distance, and then instructing the user to stop. Preferably, haptic feedback is reserved for specific actions/instructions such as instructing the user to stop, or informing the user of arrival at the final destination $o_f$. Haptic feedback may be provided in the form of a vibration, e.g. using an oscillating motor in the user's device accessing the navigation services, and/or may involve using certain patterns of vibrations to signal different information to the individual.

Referring again to the inventive navigational deep learning approach described herein, the observation space includes all possible sensor readings for position of an agent within the environment at a given point in time. The observation space is continuous, in that there are no discrete units or intervals required between any two given positions in the environment. The observation space may be expressed in any suitable manner, such as x-y coordinates within a two-dimensional space covering the environment of interest, similarly x-y-z coordinates for a three-dimensional space, GPS coordinates, latitude/longitude, etc. as would be understood by a person having ordinary skill in the art upon reading the present disclosure.

The action space describes the direction in which the agent moved from a corresponding position. The action space may be continuous or discrete, in various embodiments. For example, a continuous action space may describe the direction in which an individual moved from a first position/location to a second (preferably immediately subsequent) position/location according to an angle. A discrete action space may limit the possible directions to a predetermined set. For example, to navigate a two-dimensional space, discrete action spaces may include directions such as "forward, backward, left, and right" or using cardinal directions such as "north, north-north west, north west, west-north west, west, west-south west, south west, south-south west, south, south-south east, south east, east-south east, east, east-north east, north east, and north-north east" or any equivalent thereof that would be appreciated by a skilled artisan upon reading the present descriptions. To navigate a three-dimensional space, the discrete action space may add corresponding directions along the third (e.g. z) axis, such as "up, and down" or the like.

Of course, the foregoing are merely exemplary implementations of continuous and discrete action/observation spaces, and are not limiting on the range of suitable or equivalent continuous or discrete action/observation space representations that may be utilized in the context of the presently described inventive concepts. Skilled artisans will appreciate other equivalent implementations of continuous and discrete action/observation spaces upon reading the instant disclosure, which may be employed without departing from the scope of the invention.

Figure 5:
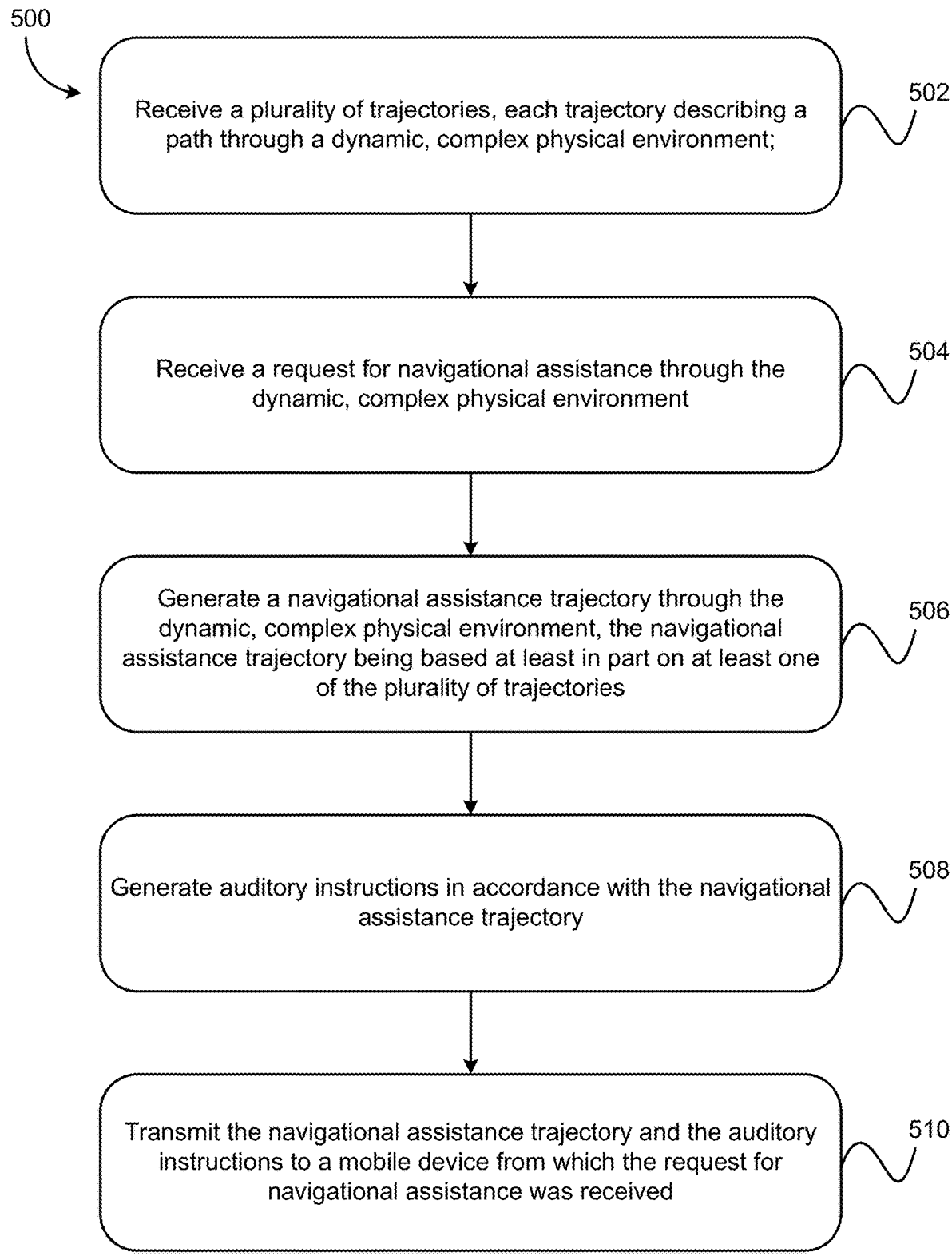
FIG. 5 is a flowchart of a method for providing adaptive imitative navigational assistance, according to one embodiment.

Now referring to FIG. 5, a flowchart of a method 500 is shown according to one embodiment. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a tablet, mobile phone, personal digital assistant, or some other device having one or more processors therein, and preferably a mobile device. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of trajectories are received. Each trajectory corresponds to, describes, or otherwise conveys a path through a dynamic, complex physical environment, e.g. in the form of stepwise directions to navigation through the environment. The trajectories are preferably generated by experts, e.g. individuals with extensive knowledge and experience navigating through the environment in question.

Operation 504 of method 500 involves receiving a request for navigational assistance through the dynamic, complex physical environment. Moreover, in response to receiving the request, operations 506-510 of method 500 are performed.

In operation 506, a navigational assistance trajectory through the dynamic, complex physical environment is generated, the navigational assistance trajectory being based at least in part on at least one of the plurality of trajectories received previously.

Operation 508 includes generating auditory instructions in accordance with the navigational assistance trajectory. The auditory instructions preferably direct the user to travel through the environment from an initial location to a final destination in a series of steps, e.g. spoken direction and distance to travel before receiving and executing the next instruction in the series.

The navigational assistance trajectory and the auditory instructions are transmitted to a mobile device from which the request for navigational assistance was received in operation 510.

Upon receipt, the requester may use the mobile device, e.g. through a dedicated application or service, to execute the auditory instructions and follow the navigational assistance trajectory to their destination.

Of course, in various embodiments the method 500 is not limited to the operations, functions, features, etc. shown in FIG. 5. Rather, it should be understood that different embodiments of method 500 may include any suitable combination or permutation of features, functions, and operations described herein. In preferred embodiments, method 500 may include any one or more of the following additional or alternative aspect, without departing from the scope of the inventive concepts presented herein.

In one approach consistent with method 500, the plurality of trajectories may be received over a period of time, enabling the navigational assistance trajectory to reflect a most recent physical state of the dynamic, complex physical environment. For example, a dynamic environment as described herein is characterized by change over time, for instance due to changing weather, construction, redecorating/remodeling (e.g. moving furniture, installing new structures, changing a floor plan/layout of a location, etc.), access restrictions, special events, and/or other factors that will be appreciated by a person having ordinary skill in the art upon reading the present descriptions. Similarly, a complex environment is generally characterized by a non-standard layout, e.g. having hallways or corridors that change at irregular intervals, have irregular intersections, etc. and/or a plethora of obstacles (such as furniture, other people, moving platforms, etc.) present therein, as would be understood by skilled artisans upon reading this disclosure.

In various embodiments, accordingly, the inventive concepts described herein continuously, periodically, etc. collect and/or receive new expert trajectories, and incorporate the new expert trajectories into a current knowledge base of expert trajectories. Over time, the new trajectories influence the policy generation and accordingly the ultimately generated navigational assistance trajectory at any given time. Advantageously, this enables the system to adapt over time to changes in the environment.

Skilled artisan will appreciate that the frequency with which new expert trajectories are obtained/incorporated into the process, as well as the length of time a given trajectory remains in the knowledge base and/or is used by the system to generate navigational assistance policies may vary in accordance with the nature of the environment, level of service to be provided, user preferences, etc. in various embodiments.

For example, according to several implementations, an outdoor environment in a geographical location with frequent weather changes may collect and/or receive new expert trajectories on a quarter-hourly, hourly, or daily basis (e.g., depending on the nature of the weather), and update the knowledge base with new trajectories on a similar schedule. On the other hand, an indoor office space with fixed furniture is unlikely to have rapid changes in layout, etc. and expert trajectories may be collected and/or received less frequently, e.g. monthly, bi-monthly, annually, etc. in various embodiments. Further still, a user may define a particular frequency/schedule with which trajectories should be updated, e.g. based on a known travel schedule, occurrence of an upcoming event, etc. Of course, expert trajectories may be received and/or collected according to any schedule, frequency, etc. without departing from the scope of the presently disclosed inventive concepts.

In a similar manner, trajectories and corresponding auditory instructions may be stored in and/or removed from the aforementioned knowledge base according to a schedule, a user request, etc. Trajectories may also be retained/discharged from the knowledge base using any suitable computer science techniques for manipulating data structures, e.g. first in first out (FIFO), first in last out (FILO), etc. as would be understood by a person having ordinary skill in the art upon reading the present descriptions.

In an alternative approach, rather than generating navigational assistance trajectories and corresponding auditory instructions in response to receiving a request from a user, the navigational assistance trajectories and corresponding auditory instructions may be generated periodically, continuously, according to a predetermined schedule, etc. and upon receiving the request, an appropriate trajectory and corresponding set of instructions may be determined, e.g. based on a designated start point and final destination included with the request.

In addition, according to some implementations generating the navigational assistance trajectory is a stochastic process employing a deep neural network-based imitation learning algorithm. In a preferred embodiment, and as shown in FIG. 4 above, two deep neural networks are used:

(1) a navigational policy generator 402 configured to generate sample trajectories based at least in part on expert trajectories provided to the generator; and (2) a navigational policy discriminator 404 configured to distinguish generated sample trajectories from the expert trajectories. Accordingly, in some approaches the imitation learning algorithm may be or include a GAIL algorithm such as shown in FIG. 3.

As described in greater detail hereinabove, in some embodiments the navigational assistance trajectory may be or include a policy, i.e. a navigation policy, and the navigation policy preferably includes or is a sequence of state-action pairs, each state corresponding to a location in the dynamic, complex physical environment and each action corresponding to a movement from a current state to a next state in the sequence of state-action pairs. Moreover, the states may be represented by an n-dimensional observation space; and/or the actions may be represented by an m-dimensional action space.

Preferably, m and n are each independently a value in a range from several hundred to several thousand. As used herein, the term "several" should be understood to include any integer value in a range from 3-5. Moreover, the term "about" shall be understood as modifying the following numerical value by a range of ±10%.

In various approaches, at least some of the observation space dimensions are continuous (non-discrete); while at least some other of the observation space dimensions are discrete. Similarly, at least some of the action space dimensions are continuous; and at least some of the action space dimensions are discrete.

Preferably, all data transmitted to the mobile device from which the request for navigational assistance was received excludes any form of optical data, image data, and video data. While the presently disclosed inventive concepts are particularly directed to assisting visually impaired individuals, of course any user may find the functionalities described herein useful and may employ such without limitation. However, to ensure full functionality for the visually impaired, in preferred embodiments the navigational assistance excludes any and all forms of visual information, e.g. optical data, images, videos, etc. as would be appreciated by a person having ordinary skill in the art upon reading the instant disclosure. Of course, in other approaches the navigational assistance may include such visual information, e.g. in response to a specific request by a user for such visual information.

The plurality of trajectories received and used to generate navigational assistance trajectories are preferably generated by a monitoring system observing one or more experts navigating through the dynamic, complex physical environment. The monitoring system collects navigational data and/or location data from one or more sources selected from the group consisting of: a video surveillance system, one or more radio frequency identification (RFID) devices, one or more Wi-Fi routers, one or more Bluetooth low energy (BLE) beacons, one or more gyroscopes, and one or more accelerometers. For instance, the experts may utilize mobile devices to log trajectories using one or more of the foregoing sources of navigational and/or location data.

In various embodiments, the method 500 may include periodically or continuously monitoring a position of the user, via the mobile device, to determine whether the mobile device (and thus the user) remains along, or in compliance with, the navigational assistance trajectory. For example, a user may take a wrong turn at an intersection, or may miss one or more directional queues and stray off the path of the trajectory, particularly in open spaces where much freedom of movement is possible.

Periodically/continuously checking the position of the user may include querying the mobile device and/or one or more location sensors for the location of the mobile device within the given environment. Where the monitoring is performed periodically, the user's position may be queried/determined according to a predetermined schedule, e.g. every 5 seconds, every 10 seconds, every 30 seconds, etc. according to the complexity of the environment and tolerance for error by the user.

A predetermined threshold distance may be set, and upon determining the user deviates from a trajectory by a distance, an amount of time, or any other suitable metric, in an amount greater than or equal to the predetermined threshold, a warning may be issued, and/or a new navigational assistance trajectory generated for the user.

Preferably, as the user approaches the threshold distance/time, etc. deviation from the original navigational assistance trajectory, a series of warnings (and more preferably, correctional actions) may be issued to the user via the mobile device. The warnings may be issued at predetermined intervals/distances/etc. of the ultimate deviation threshold. For example, in one embodiment warnings and/or corrective actions may be issued as a user approaches a distance/time/etc. deviation of about 25% that of the ultimate deviation threshold, about 50% of that of the ultimate deviation threshold, and about 75% of that of the ultimate deviation threshold.

At any rate, upon determining the mobile device (and thus the user) has traveled a time/distance/etc. greater than the ultimate deviation threshold away from the navigational assistance trajectory, a new navigational assistance trajectory may be generated substantially as described hereinabove, but in addition to taking into account the expert trajectory/trajectories, the user's current position is also taken into account, e.g. as a new starting position in a new round of generative, imitative learning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for adaptive imitation learning and navigational assistance, comprising:
   receiving a plurality of trajectories, each trajectory describing a path through a dynamic, complex physical environment;
   receiving a request for navigational assistance through the dynamic, complex physical environment; and
   in response to receiving the request for the navigational assistance:
      generating a navigational assistance trajectory through the dynamic, complex physical environment, the navigational assistance trajectory being based at least in part on at least one of the plurality of trajectories;
      generating auditory instructions in accordance with the navigational assistance trajectory; and
      transmitting the navigational assistance trajectory and the auditory instructions to a mobile device from which the request for the navigational assistance was received, for output of the auditory instructions by the mobile device to a user.

2. The computer-implemented method of in claim 1, wherein the plurality of trajectories are received over a period of time, and wherein the navigational assistance trajectory reflects a most recent physical state of the dynamic, complex physical environment.

3. The computer-implemented method of in claim 1, wherein generating the navigational assistance trajectory is a stochastic process employing a deep neural network-based imitation learning algorithm.

4. The computer-implemented method of claim 1, wherein the navigational assistance trajectory comprises a sequence of state-action pairs, each state corresponding to a location in the dynamic, complex physical environment and each action corresponding to a movement from a current state to a next state in the sequence of state-action pairs.

5. The computer-implemented method of claim 4, wherein the states are represented by an n-dimensional observation space;
   wherein the actions are represented by an m-dimensional action space; and
   wherein m and n are each independently a value in a range from several hundred to several thousand.

6. The computer-implemented method of claim 4, wherein the states are represented by an n-dimensional observation space;
   wherein at least some dimensions of the observation space are continuous;
   wherein at least some other of the dimensions of the observation space are discrete;
   wherein the actions are represented by an m-dimensional action space;
   wherein at least some dimensions of the action space are continuous; and
   wherein at least some of other the dimensions of the action space are discrete.

7. The computer-implemented method of claim 1, wherein all data transmitted to the mobile device from which the request for the navigational assistance was received excludes any form of optical data, image data, and video data.

8. The computer-implemented method of claim 1, wherein the plurality of trajectories are generated by a monitoring system observing one or more experts navigating through the dynamic, complex physical environment.

9. The computer-implemented method of claim 1, further comprising:
   determining whether the mobile device from which the request for the navigational assistance was received remains in compliance with the navigational assistance trajectory;
   in response to determining the mobile device is out of compliance with the navigational assistance trajectory, generating a new navigational assistance trajectory through the dynamic, complex physical environment; and
   wherein the new navigational assistance trajectory is based at least in part on at least one of the plurality of trajectories and a position of the mobile device at a time of determining the mobile device is out of compliance with the navigational assistance trajectory.

10. A computer program product for adaptive, imitative navigational assistance, the computer program product comprising a computer readable storage medium having program instructions embodied therewith, wherein the computer readable storage medium is not a transitory signal per se, the program instructions executable by a processor, to cause the processor to perform a method comprising:
   receive, at the processor, a plurality of trajectories, each trajectory describing a path through a dynamic, complex physical environment;
   receive, at the processor, a request for navigational assistance through the dynamic, complex physical environment; and
   in response to receiving the request for the navigational assistance:
      generate, using the processor, a navigational assistance trajectory through the dynamic, complex physical environment, the navigational assistance trajectory being based at least in part on at least one of the plurality of trajectories;
      generate, using the processor, auditory instructions in accordance with the navigational assistance trajectory; and
      transmit the navigational assistance trajectory and the auditory instructions to a mobile device from which the request for the navigational assistance was received, for output of the auditory instructions by the mobile device to a user.

11. The computer program product of claim 10, wherein the plurality of trajectories are received over a period of time, and wherein the navigational assistance trajectory reflects a most recent physical state of the dynamic, complex physical environment.

12. The computer program product of claim 10, wherein generating the navigational assistance trajectory is a stochastic process employing a deep neural network-based imitation learning algorithm.

13. The computer program product of claim 10, wherein the navigational assistance trajectory comprises a sequence of state-action pairs, each state corresponding to a location in the dynamic, complex physical environment and each action corresponding to a movement from a current state to a next state in the sequence of the state-action pairs.

14. The computer program product of claim 13, wherein the states are represented by an n-dimensional observation space;
wherein the actions are represented by an m-dimensional action space; and
wherein m and n are each independently a value in a range from several hundred to several thousand.

15. The computer program product of claim 13, wherein the states are represented by an n-dimensional observation space;
wherein at least some dimensions of the observation space are continuous;
wherein at least some other of the dimensions of the observation space are discrete;
wherein the actions are represented by an m-dimensional action space;
wherein at least some dimensions of the action space are continuous; and
wherein at least some other of the dimensions of the action space are discrete.

16. The computer program product of claim 10, wherein all data transmitted to the mobile device from which the request for the navigational assistance was received excludes any form of optical data, image data, and video data.

17. The computer program product of claim 10, wherein the plurality of trajectories are generated by a monitoring system observing one or more experts navigating through the dynamic, complex physical environment.

18. The computer program product of claim 10, further comprising program instructions executable by the processor to cause the processor to perform:

determining, using the processor, whether the mobile device from which the request for the navigational assistance was received remains in compliance with the navigational assistance trajectory;
in response to determining the mobile device is out of compliance with the navigational assistance trajectory, generating, using the processor, a new navigational assistance trajectory through the dynamic, complex physical environment; and
wherein the new navigational assistance trajectory is based at least in part on at least one of the plurality of trajectories and a position of the mobile device at a time of determining the mobile device is out of compliance with the navigational assistance trajectory.

19. A system for adaptive, imitative navigational assistance, comprising:
a processor; and
logic integrated with the processor, executable by the processor, or integrated with and executable by the processor, the logic being configured to:
receive, at the processor, a plurality of trajectories, each trajectory describing a path through a dynamic, complex physical environment;
receive, at the processor, a request for navigational assistance through the dynamic, complex physical environment; and
in response to receiving the request for the navigational assistance:
generate, using the processor, a navigational assistance trajectory through the dynamic, complex physical environment, the navigational assistance trajectory being based at least in part on at least one of the plurality of trajectories;
generate, using the processor and a machine learning algorithm, auditory instructions in accordance with the navigational assistance trajectory; and
transmit the navigational assistance trajectory and the auditory instructions to a mobile device from which the request for the navigational assistance was received.

20. The system of claim 19, wherein all data transmitted to the mobile device from which the request for the navigational assistance was received excludes any form of optical data, image data, and video data.

* * * * *